US008292232B1

(12) United States Patent
Andrews et al.

(10) Patent No.: US 8,292,232 B1
(45) Date of Patent: Oct. 23, 2012

(54) DEPLOYABLE DECELERATOR BASED MICROSATELLITE RECOVERY

(75) Inventors: Dana G. Andrews, Seattle, WA (US); Michael Beerman, Seattle, WA (US); Kevin A. Brown, Seattle, WA (US); Jeffrey H. Cannon, Maple Valley, WA (US); Krissa E. Watry, Puyallup, WA (US); Jason Andrews, Seattle, WA (US)

(73) Assignee: Andrews Space, Inc., Tukwila, WA (US)

( * ) Notice: Subject to any disclaimer, the term of this patent is extended or adjusted under 35 U.S.C. 154(b) by 241 days.

(21) Appl. No.: 12/854,827

(22) Filed: Aug. 11, 2010

Related U.S. Application Data

(60) Provisional application No. 61/233,072, filed on Aug. 11, 2009.

(51) Int. Cl.
*B64G 1/00* (2006.01)
(52) U.S. Cl. .................. 244/159.1; 244/158 R; 244/160
(58) Field of Classification Search ............... 244/159.1, 244/158.1, 1 R, 171.1, 171.8, 171.9, 172.1, 244/172.4; 89/1.11; 102/518; 52/80.1
See application file for complete search history.

(56) References Cited

U.S. PATENT DOCUMENTS

| | | | | |
|---|---|---|---|---|
| 3,118,636 A * | 1/1964 | Kantrowitz et al. | ....... | 244/159.1 |
| 3,143,321 A * | 8/1964 | McGehee et al. | ......... | 244/100 R |
| 3,181,809 A * | 5/1965 | Lobelle | .......... | 244/1 R |
| 3,286,951 A * | 11/1966 | Kendall | ...... | 244/159.2 |
| 3,416,750 A * | 12/1968 | Young | ........ | 244/159.1 |
| 3,512,736 A * | 5/1970 | Anderson et al. | ......... | 244/159.1 |
| 4,504,031 A * | 3/1985 | Andrews | .......... | 244/113 |
| 4,518,137 A * | 5/1985 | Andrews | .......... | 244/113 |
| 4,832,288 A * | 5/1989 | Kendall et al. | .......... | 244/159.2 |
| 4,896,847 A * | 1/1990 | Gertsch | ....... | 244/159.1 |
| 5,108,047 A * | 4/1992 | Puech | ........ | 244/113 |
| 5,927,653 A * | 7/1999 | Mueller et al. | .......... | 244/171.3 |
| 7,669,802 B2 * | 3/2010 | Dorman | ..... | 244/158.1 |
| 7,837,154 B2 * | 11/2010 | Trabandt et al. | ........ | 244/159.1 |

OTHER PUBLICATIONS

"CubeSat Design Specification Rev. 12," The CubeSat Program, California Polytechnic State University, San Luis Obispo, <http://www.cubesat.org/images/developers/cds_rev12.pdf> [retrieved Jul. 27, 2010], 22 pages.

* cited by examiner

*Primary Examiner* — Christopher P Ellis
*Assistant Examiner* — Medhat Badawi
(74) *Attorney, Agent, or Firm* — Christensen O'Connor Johnson Kindness PLLC

(57) ABSTRACT

A satellite recovery apparatus having a base configured to be attached to a satellite and having a pressurized gas chamber and a valve assembly. A plurality of walls are hingedly attached to the base and movable between a closed position, wherein the walls define a volume above the base, and an open position, wherein the walls are disposed spaced away from the base. A heat shield is attached to the base. A deployable decelerator is attached to the heat shield and has an outer perimeter with an expandable torus that is operably connected to the valve assembly such that the expandable torus can be pressurized from the chamber. Pressurization of the expandable torus deploys the decelerator assembly from a non-deployed position within the volume to a deployed high-drag position.

23 Claims, 14 Drawing Sheets

DEPLOYABLE DECELERATOR BASED MICROSATELLITE RECOVERY

CROSS-REFERENCE TO RELATED APPLICATION

This application claims the benefit of Provisional Application No. 61/233,072, filed Aug. 11, 2009, the entire disclosure of which is hereby incorporated by reference in its entirety.

BACKGROUND

Humans have been placing satellites into earth orbit since the launch of Sputnik 1 on Oct. 4, 1957. Most satellites placed in orbit are not designed or intended for recovery back on the earth. Indeed, the recovery of satellites from earth orbit is extraordinarily difficult and expensive. However, there are many situations wherein the intact recovery of particular satellites is desirable. For example, orbital experiments designed to test the effects of space on biological, chemical, or material properties may benefit from the retrieval of specimens placed in orbit.

Prior art systems for protecting physical payloads from the severe aerodynamic and thermal conditions during atmospheric reentry require the expense of initially lifting protective structures and materials to orbit. In some space systems intended for safe return to Earth, various mechanisms have been employed to slow the satellite sufficiently to effect reentry, using high-drag means for initially slowing the satellite through the atmosphere, and deploying parachutes and/or rocket systems for the final portion of the return. However, such systems are complex and relatively heavy.

Deployable aerobraking systems such as ballutes are disclosed in U.S. Pat. No. 4,504,031, "Aerodynamic Braking and Recovery Method for a Space Vehicle," and U.S. Pat. No. 4,518,137, "Aerodynamic Braking System for a Space Vehicle," by D. G. Andrews, both of which are hereby incorporated by reference in their entirety. These disclosures describe a gas deployed ballute system for placing a space system in low earth orbit, which additionally utilizes the vehicle's main rocket motor to produce cooling exhaust gases ahead of the vehicle on reentry.

There is a growing trend away from large and complex satellite systems and moving towards lower-cost, miniaturized, or small satellites. Advantages of small satellites are lower cost, lower weight (and hence lower launch costs), and ease of production. Moreover, miniaturized satellites enable missions that larger satellites are not suited for, such as constellations for data communications, the ability to work in coordination gathering data from different orbital locations, etc. For example, small satellites may be classified as: minisatellites (100-500 kg); microsatellites (10-100 kg); nanosatellites (1-10 kg), and picosatellites (<1 kg).

A particular standard for small satellites, referred to as the CubeSat Project, provides a standard for the design of nanosatellites to reduce cost and development time, increase accessibility to space, and sustain frequent launches, as discussed in *CubeSat Design Specification Rev.* 12, The CubeSat Program, California Polytechnic State University, which is hereby incorporated by reference in its entirety. The nominal 1 U CubeSat is a 10 cm cube with a mass of up to 1.33 kg. In some applications, two or more 1 U units are combined, or interconnected in a modular fashion, to produce a system.

An object of the invention is to provide a system for recovering small payloads and spacecraft using a deployed system that is of appropriate size to effect a completely passive reentry through the atmosphere of a planetary body and subsequent aerodynamic deceleration such that the spacecraft can be safely recovered without the use of a secondary deceleration system, such as a parachute.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A satellite recovery system is disclosed for attachment or incorporation into a satellite, to facilitate return and recovery of the satellite. The system includes a base assembly with a pivotally attached wall portion that is movable between a non-deployed position wherein the wall assembly defines a partially-enclosed cavity, and a deployed position wherein the wall assembly is disposed away from the cavity. A heat shield is attached to the base portion, for example with a shock-absorbing strut. A deployable decelerator assembly is disposed in the cavity when in the deployed position, and is deployable to provide a high-drag component. In a particular embodiment, the deployable decelerator assembly includes an inner perimeter that is attached to the heat shield and an outer perimeter having an expandable torus that is operably connected to a pressurized gas system in the base assembly.

In an embodiment, the pressurized gas system comprises a chamber, an inlet valve configured for pressurizing the chamber, and a controllable outlet valve that fluidly connects the expandable torus to the pressurized chamber, and the pressurant in the pressurized chamber is carbon dioxide. The outlet valve may comprise a remotely triggerable solenoid valve. The valve assembly may further comprise one or more of a high pressure relief valve to prevent over-pressurization of the pressure chamber, and a low pressure relief valve to prevent over-pressurization of the torus.

In an embodiment, the valve assembly releases pressurant through a restricting orifice disposed between the pressurized chamber and the torus, such that when the outlet valve is opened the restricting orifice impedes the flow of pressurant to the torus such that pressure in the torus varies during reentry. In particular, the restricting orifice may be designed to produce a flow of pressurant to the torus such that the pressure profile in the torus varies over time, for example to produce a peak pressure in the torus when the satellite and recovery system are expected to experience peak aerodynamic loading.

In a particular embodiment, the heat shield includes a dome portion formed from a rigid, heat resistant material such as ceramic, carbon-carbon composite, refractory metal alloy or the like, and a base portion attached to the dome portion. A core portion may be provided comprising a fibrous insulation. The heat shield may be attached to the base portion with an elongate tubular strut, having engineered points of weakness, for example longitudinal notches, such that on impact with the ground the strut will fail in a predictable manner, in order to absorb some of the energy of the impact, thereby protecting the returning satellite.

In a particular embodiment the wall assembly comprises four walls that are hingedly attached to the base portion with four-bar linkage systems that are configured such that the walls can pivot one hundred eighty degrees from the non-deployed position, and the walls are displaced outwardly away from the base when they are in the pivoted (deployed) position. The walls may be interlocked and biased away from the non-deployed position and towards the deployed position, and a remotely actuatable release mechanism may be provided that releases the walls to deploy when the actuatable release mechanism is actuated.

In a particular embodiment, the deployable decelerator assembly comprises a flexible fabric panel formed from a high-temperature-resistant fabric selected from a thermoset liquid crystalline polyoxazole that may be coated with an ablative material, for example a reinforced elastomer. The torus may be formed from any suitable material, for example a silicone rubber and a polyimide.

In another embodiment a deployable satellite recovery apparatus includes a base assembly having a pressurized chamber and a controllable outlet valve connecting the pressurized chamber to an outlet port that is fluidly connected to an inflatable torus. A wall assembly is hingedly attached to the base and is movable between a non-deployed position and a deployed position. A heat shield is attached to the base with a crushable strut, and a deployable decelerator assembly is fixed to the heat shield at an inner perimeter and encloses the torus at an outer perimeter. Activation of the controllable outlet valve when the wall assembly is in the deployed position causes the deployable decelerator assembly to deploy from a non-deployed position, in which the deployable decelerator assembly is disposed substantially in the volume defined over the base, to a deployed position, wherein the tube is pressurized such that the deployable decelerator assembly defines a flexible frustoconical panel extending from the heat shield.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

A deployable decelerator system is disclosed that slows the satellite from low earth orbit all of the way to the surface, for a relatively gentle landing on earth. Although it is contemplated that many satellites may include a separate rocket motor and guidance system that provides sufficient thrust to orient the satellite system and initiate reentry, the present system may be used to provide drag to accelerate reentry into the atmosphere. In particular, a high-temperature-resistant, deployable, aerodynamic structure is disclosed that is suitable for use as a decelerator. The initially flexible material may be stored in a small volume to accommodate launch vehicle constraints and the like. The disclosed deceleration system is initially contemplated for deployment in a modular device that is adapted to engage a small satellite. For example the deceleration system may be in a 1 U volume form factor compliant with the CubeSat specification (referenced below), and configured to engage a CubeSat or other small device. However, it will be apparent to persons of skill in the art, and it is contemplated by the present invention, that the methods and apparatus disclosed may by adapted and utilized in other contexts and in other system designs. For example, it is contemplated that the present invention may be practiced as a component for a stand-alone space system, such as an asteroid, comet, moon, or planetary sample return mission.

An advantage of the present invention is that a single device is used to escort the small satellite all the way from orbit to a soft landing.

Figure 1:
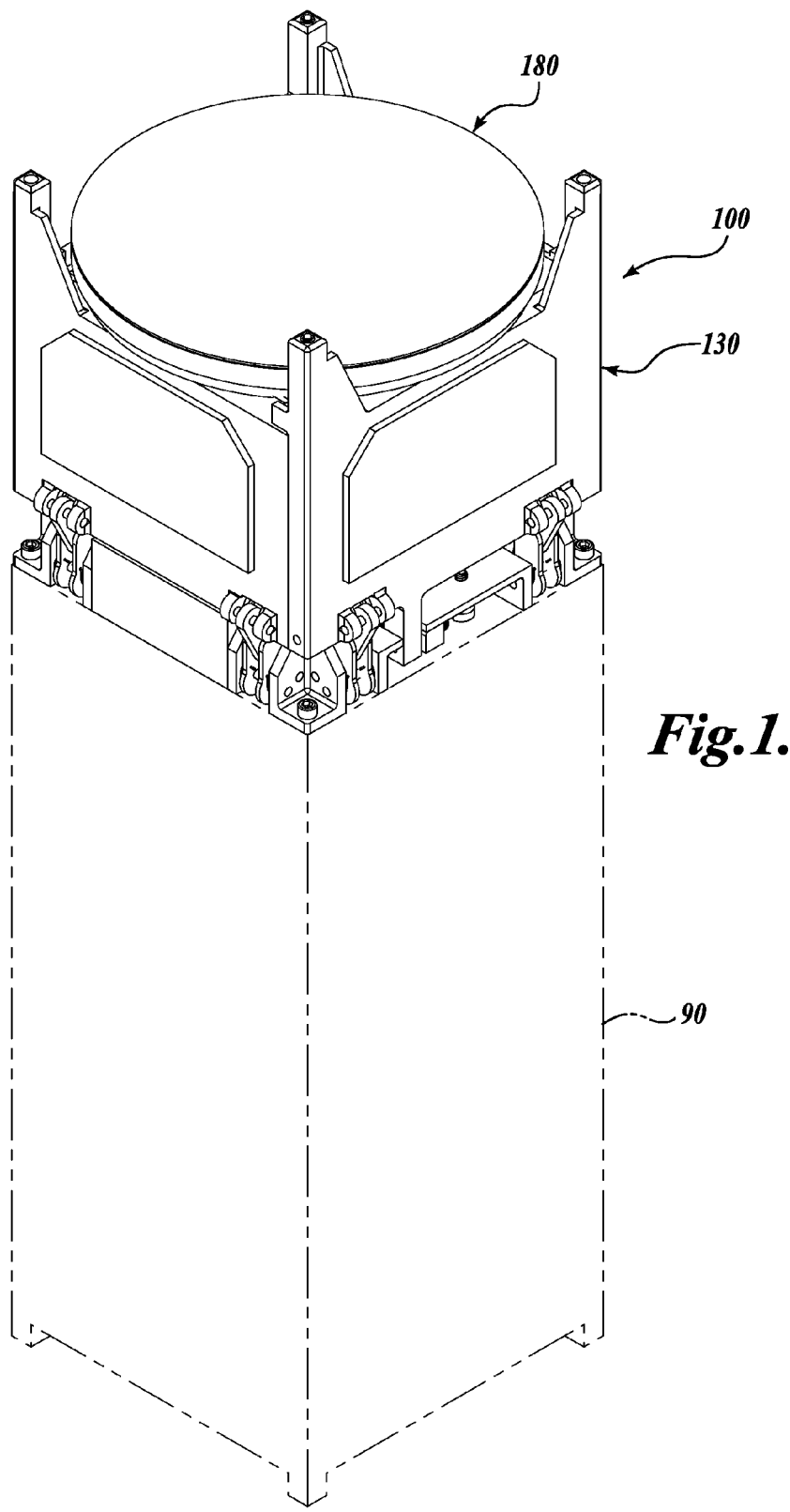
FIG. 1 is a perspective view of a deployable deceleration system in accordance with the present invention, shown attached to a payload such as a 2 U CubeSat (in phantom), and shown prior to deployment of the deceleration system.
Figure 2:
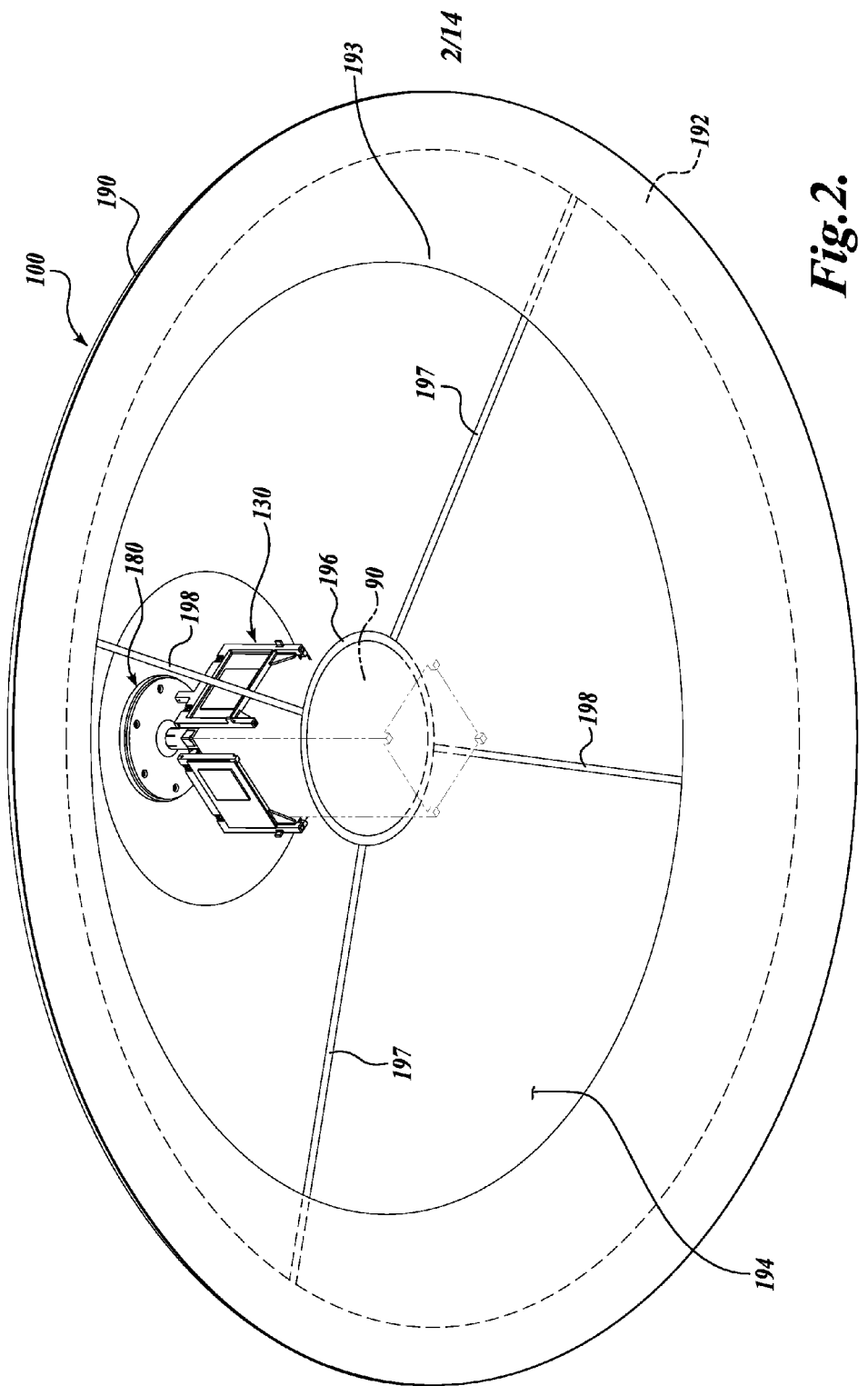
FIG. 2 is a perspective view of the deployable deceleration system illustrated in FIG. 1, in the deployed position.

A deployable aerobraking deceleration system 100 in accordance with the present invention is shown in FIG. 1, in the non-deployed position, and shown with a payload 90, such as a 2 U CubeSat attached (shown in phantom). FIG. 2 shows the deceleration system 100 in the deployed position. In this embodiment, the deceleration system 100 is designed in accordance with revision 12 of the CubeSat Design Specification, The CubeSat Program, Cal Poly SLO (2009), which is hereby incorporated by reference in its entirety (www.cubesat.org). The CubeSat Project was developed by California Polytechnic State University, San Luis Obispo, and Stanford University's Space Systems Development Lab. As noted on its website at www.cubesat.org:

"We provide the community with:
A standard physical layout and design guidelines.
A standard, flight proven deployment system (P—POD).
Coordination of required documents and export licenses.
Integration and acceptance testing facilities with formalized schedules.
Shipment of flight hardware to the launch site and integration to LV.
Confirmation of successful deployment and telemetry information."

However, the present invention is not limited to the CubeSat form factor, and it is contemplated that the present invention may be produced in a variety of different sizes and configurations, to accommodate particular mission needs.

It will be appreciated by comparing FIG. 1 with FIG. 2 that the deceleration system 100 expands from a very small configuration (non-deployed position) to a relatively very large configuration (deployed position) to produce a relatively large drag device, thereby facilitating reentry from orbit.

Figure 3:
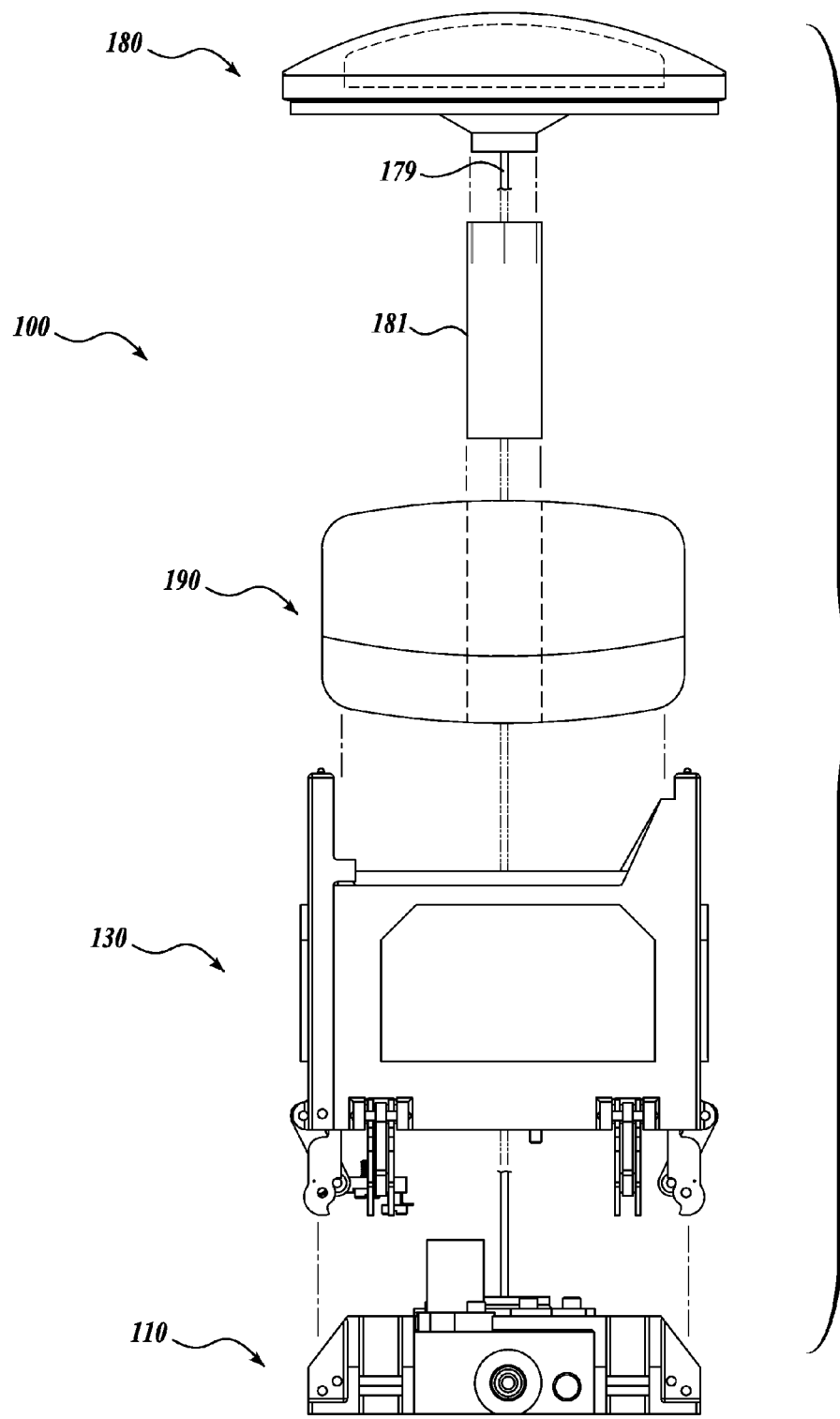
FIG. 3 is a partially exploded right side view of the deployable deceleration system shown in FIG. 1.

Referring now also to FIG. 3, which shows a partially exploded, right-side view of the current deceleration system 100, illustrating the major assemblies: a base assembly 110, a four-part deployable wall assembly 130 pivotably attached to the base assembly 110, a rigid heat shield 180 mounted to the base assembly 110 with a cable 179 and a shock-absorbing splitting strut 181 discussed below, and a flexible, deployable decelerator assembly 190, comprising an inflatable torus 192 (FIG. 2) and a flexible drag device 194 that is generally conical in shape during use. The deployable decelerator assembly 190 is fixedly attached to the heat shield 180.

Figure 4A:
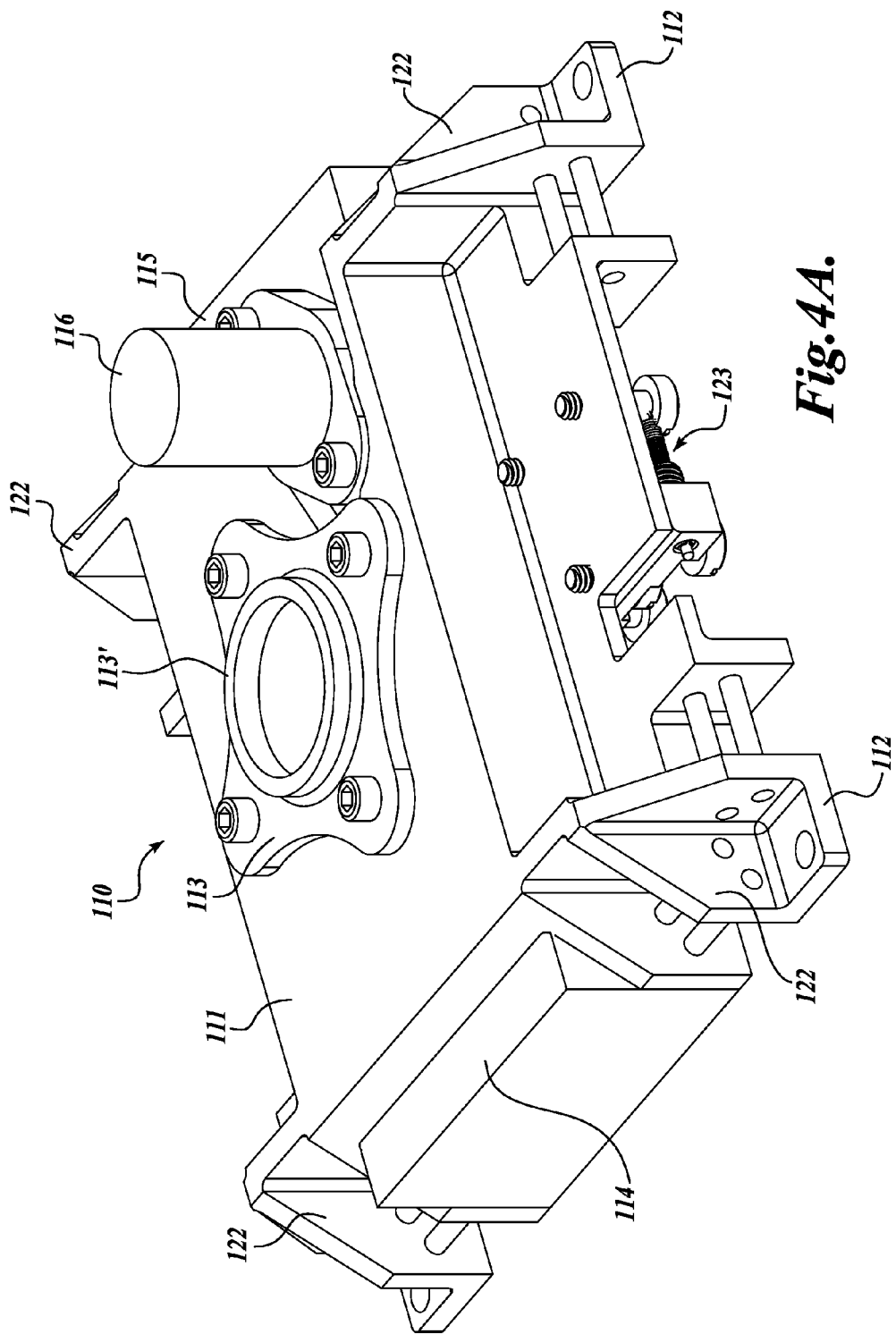
FIG. 4A is a perspective view of the base assembly of the deployable deceleration system shown in FIG. 1.

FIG. 4A shows a perspective view of the base assembly 110. The base assembly 110 includes a support structure 111 having attachment corner flanges 112, and defines spaced-apart wall-mounting flanges 122 for pivotally attaching the members of the four-part wall assembly 130 to the base assembly 110. A strut support 113 having an annular flange 113' sized to receive the heat shield strut 181 (not shown in FIG. 4A) is attached to the top of the support structure 111. A manifold/pressure chamber 114 is disposed inside of the support structure 111, and a valve assembly 115 is disposed in the opposite side of the support structure 111. The valve assembly 115 includes a solenoid valve 116 for controlling the gas flow from the pressure chamber 114 to the outlet port 127 (see, FIG. 4B).

Figure 4B:
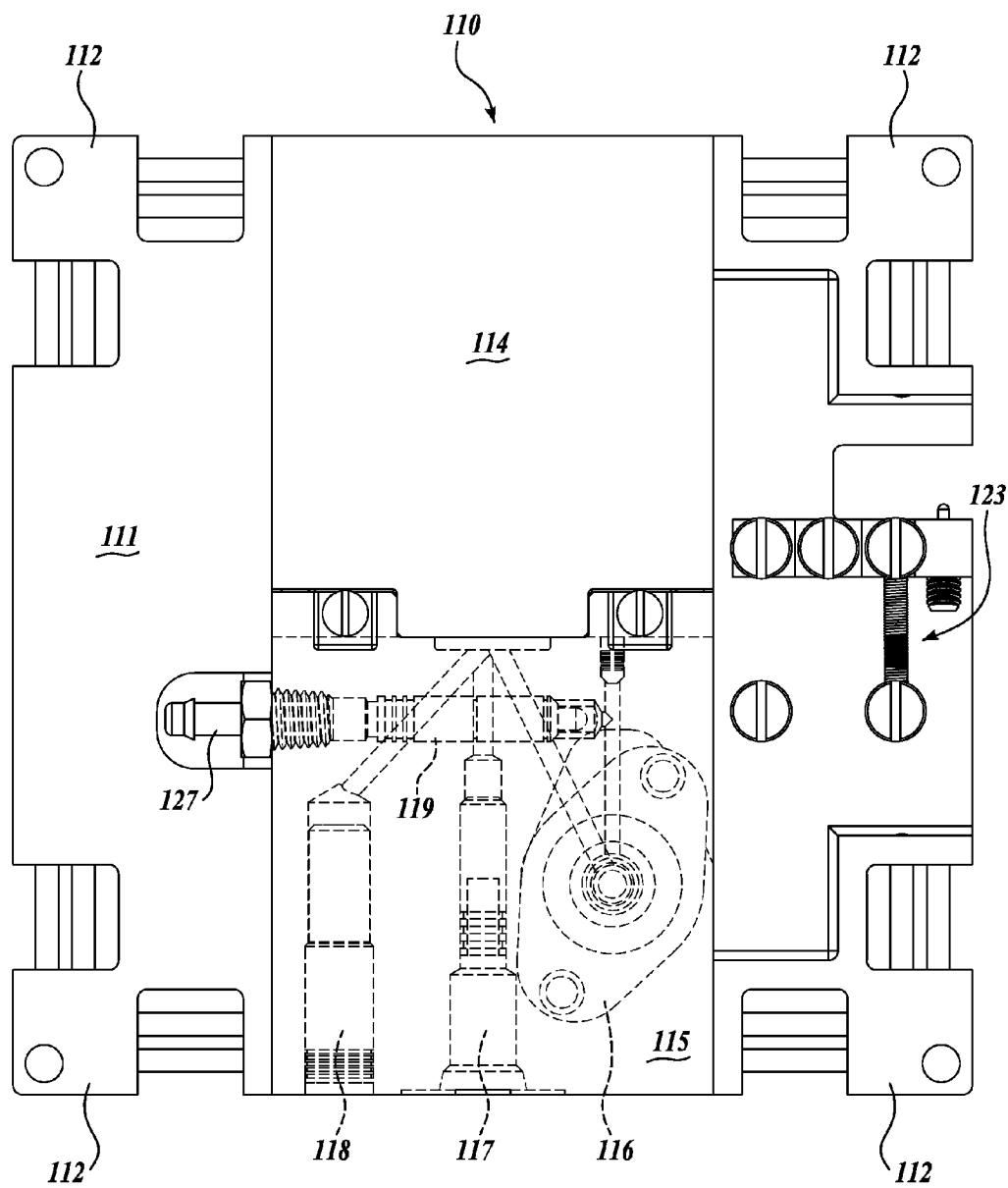
FIG. 4B is a bottom view of the base assembly of the deployable deceleration system shown in FIG. 1, with certain internal features of the valve assembly shown in phantom.
Figure 4C:
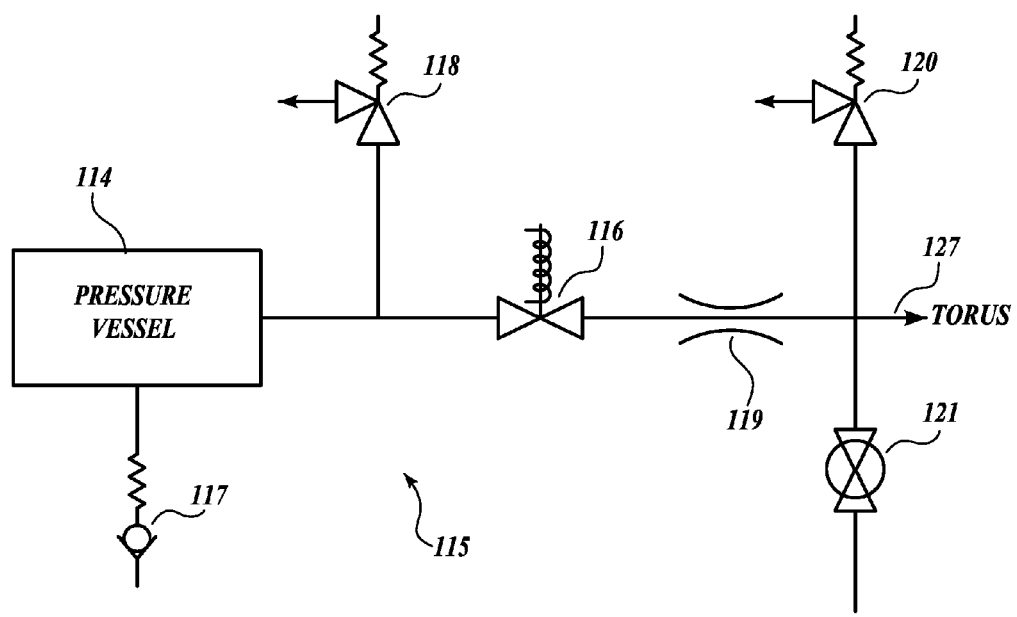
FIG. 4C is a block diagram of the valve system in the base assembly of the deployable deceleration system shown in FIG. 1.

FIG. 4B shows a bottom view of the base assembly 110, with certain internal features of the valve assembly 115 shown in phantom. Also, refer to FIG. 4C, which shows a functional diagram of the valve assembly 115. In particular, the valve assembly includes a fill port and a check valve 117 for pressurizing the pressure vessel or chamber 114. In a current embodiment the deceleration system uses $CO_2$ gas as the pressurant, wherein the CO2 is in a multi-phase mixture (e.g., liquid and gas) in the pressure chamber 114. A high-pressure relief valve 118 is also provided to prevent over-pressurization of the chamber 114. Outflow from the pressure chamber 114 to the inflatable torus 192 is controlled by the solenoid valve 116, and flows through a restricting orifice 119, such as to provide gradual inflation of the torus 192 through the outlet port 127. As discussed below, the gradual inflation permits the timing of the peak pressure in the torus 192 to be controlled to optimize system performance. A low-pressure relief valve 120 protects downstream components, e.g., the inflatable torus 192 from over-pressurization. A vent/evacuation ball valve 121 is also provided, as shown in FIG. 4C. Also visible in FIG. 4B is a burn wire mechanism 123 which is actuated to initiate deployment of the wall assembly 130.

Figure 5A:
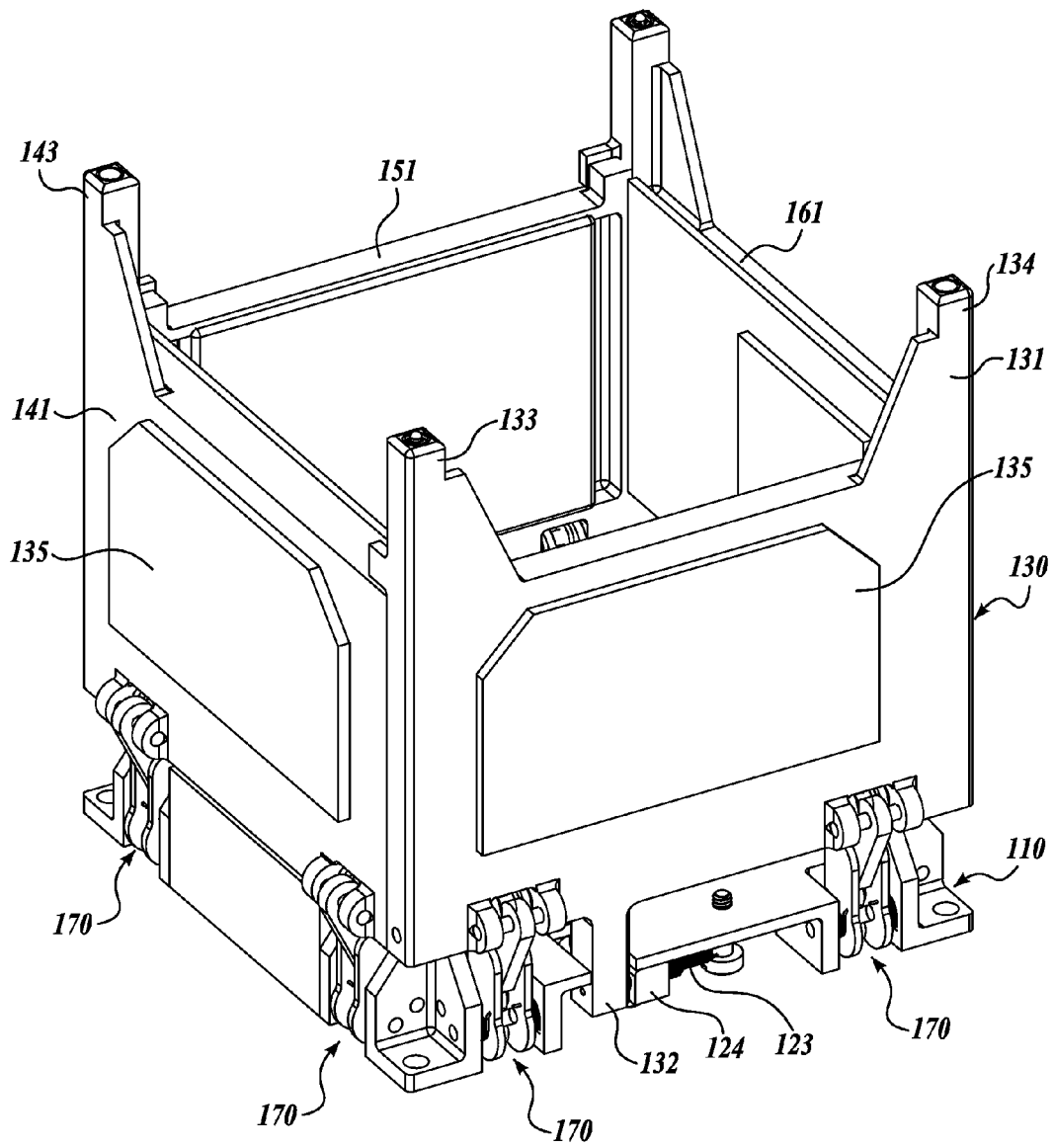
FIG. 5A is a perspective front-left view of the base assembly and wall assembly for the deployable deceleration system shown in FIG. 1, in the non-deployed position.
Figure 5B:
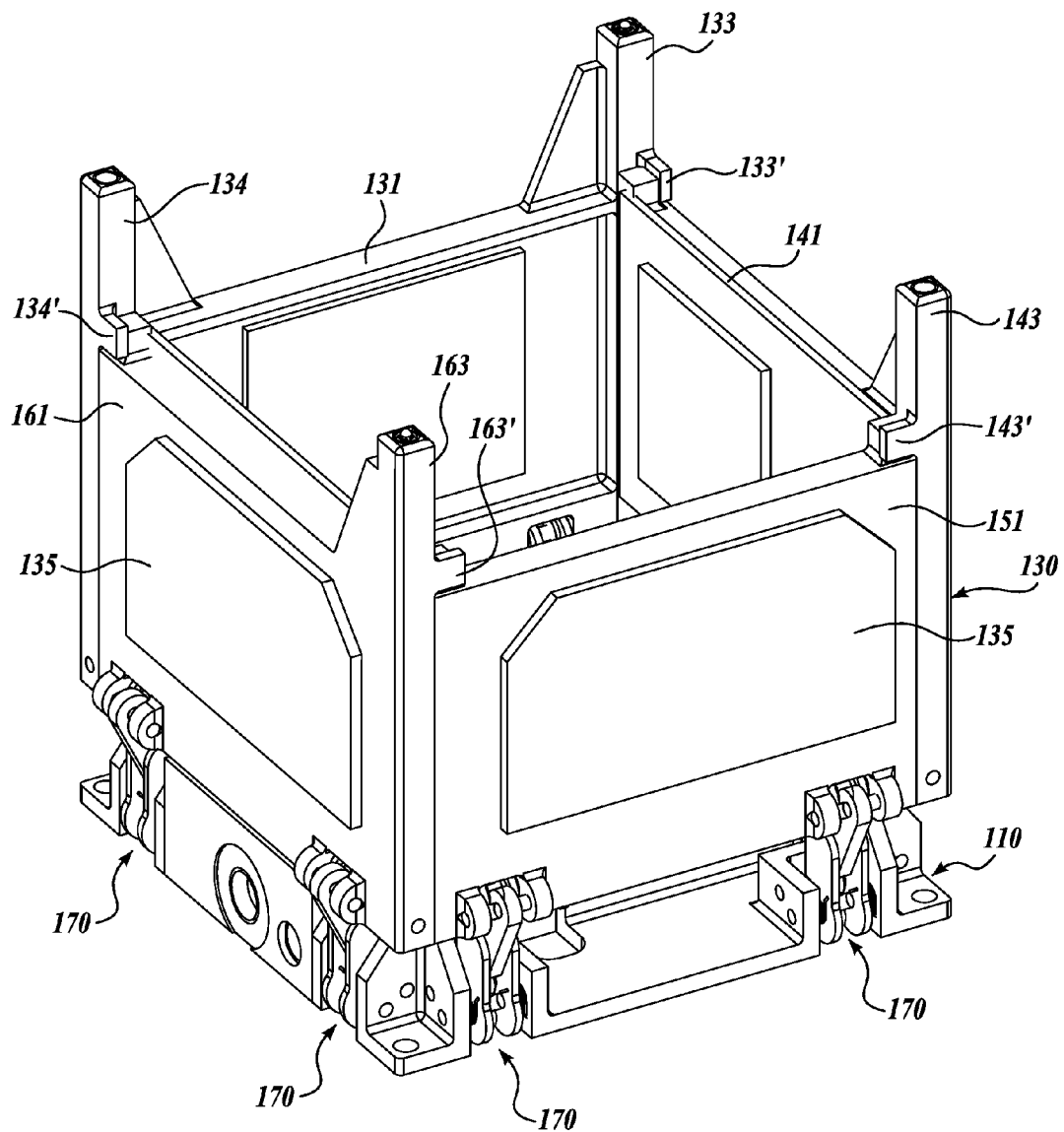
FIG. 5B is a perspective rear-right perspective view of the base assembly and wall assembly for the deployable deceleration system shown in FIG. 1, in the non-deployed position.

FIG. 5A shows a perspective view of the four-part wall assembly 130 attached to the base assembly 110 in the non-deployed position, and FIG. 5B shows a perspective view of the four-part wall assembly 130 and base assembly 110 from a rearward side. The four-part wall assembly 130 includes a front wall 131, a left wall 141, a rear wall 151, and a right wall 161. All four of the walls 131, 141, 151, 161 are hingedly attached to the base 110 with spring-loaded linkage systems 170, such that the walls are biased towards the deployed position. The front wall 131 includes a downwardly disposed control post 132 that releasably engages a stop 124 that holds the front wall 131 in the non-deployed position. The stop 124 engages the burn wire mechanism 123, such that the front wall 131 may be released from the stop 124, for example, by a timed signal or a remote signal to activate the burn wire mechanism 123. In this embodiment, the walls 131, 141, 151, 161 further include a solar cell 135 attached to an outer surface of the wall.

The front wall 131 defines a left edge or rail portion 133 and a right edge or rail portion 134. As seen most clearly in FIG. 5B, the left rail portion 133 includes a stop 133' that engages the left wall 141 when the wall assembly 130 is in the non-deployed position, such that the left wall 141 is restrained from pivoting outwardly as long as the front wall 131 remains in the non-deployed position. Similarly, the right rail portion 134 includes a stop 134' that engages the right wall 161 when the wall assembly 130 is in the non-deployed position, such that the right wall 161 is also restrained from pivoting outwardly. The left wall 141 defines a left edge or rail portion 143 that includes a stop 143' positioned to engage the rear wall 151, and the right wall 161 defines a right rail portion 163 that includes a stop 163' positioned to engage the rear wall 151. As noted above, the walls 131, 141, 151, 161, are biased toward the deployed position by the linkage systems 170. Therefore, it will be appreciated that if the front wall 131 is released such that it can pivot towards the deployed position (see FIG. 6A) then the other walls 141, 151, 161 will also deploy.

Figure 6A:
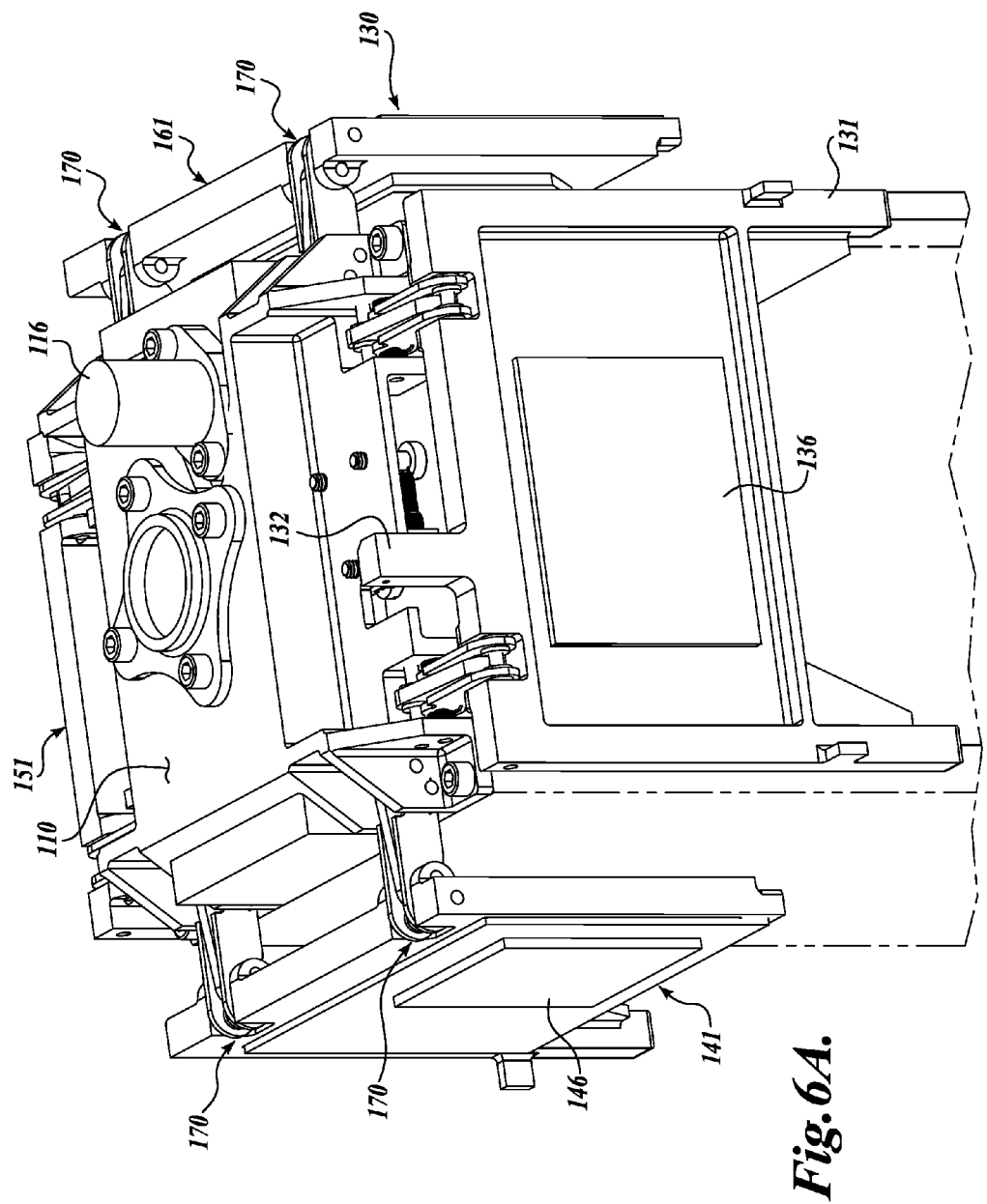
FIG. 6A is a perspective front-left view of the base assembly and wall assembly for the deployable deceleration system shown in FIG. 1, in the deployed position.
Figure 6B:
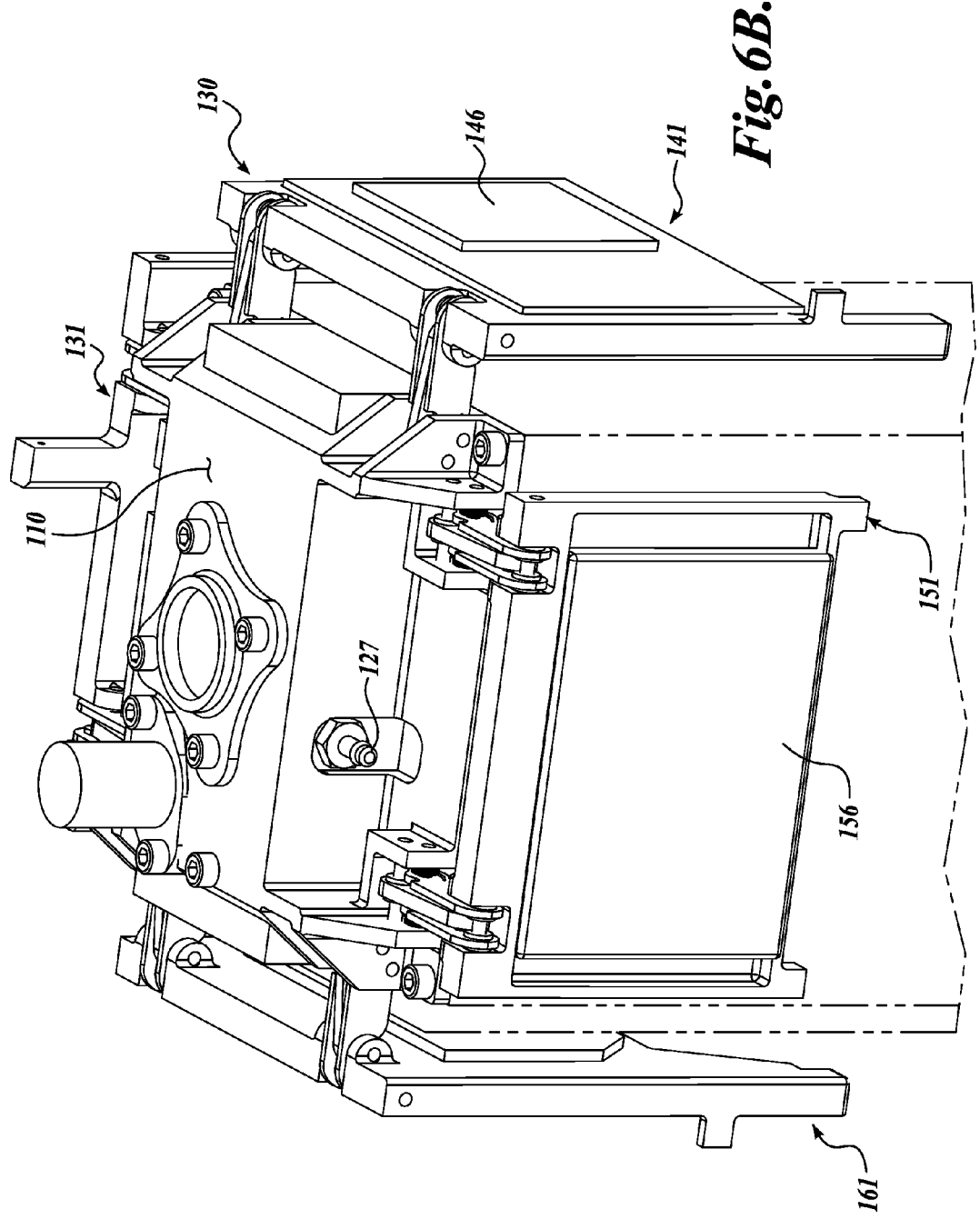
FIG. 6B is a perspective generally rear view of the base assembly and wall assembly for the deployable deceleration system shown in FIG. 1, in the deployed position.

FIG. 6A shows a front perspective view of the base assembly 110 and wall assembly 130, shown in the deployed position, and FIG. 6B shows a rear perspective view of the base assembly 110 and wall assembly 130 in the deployed position.

Figure 6C:
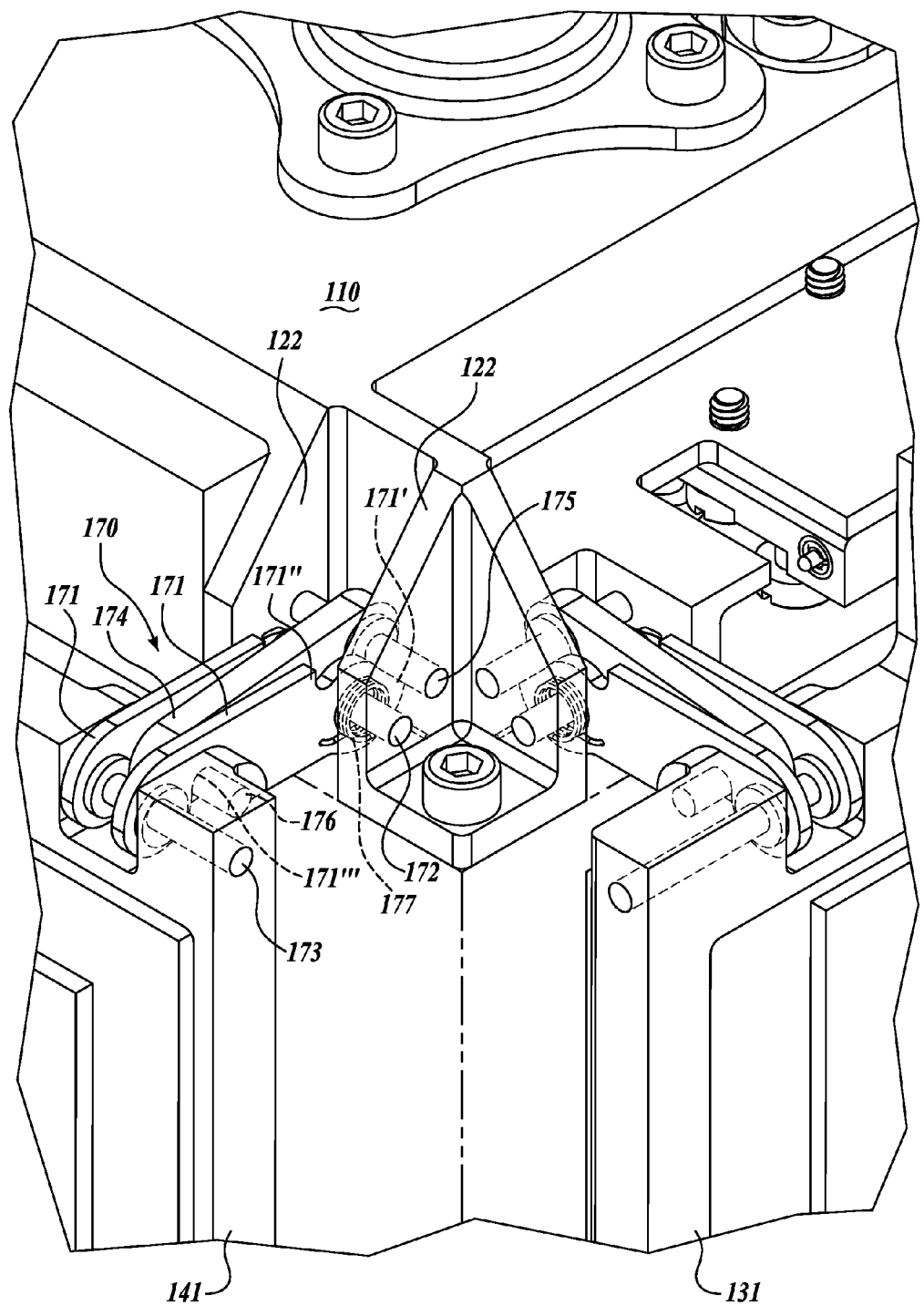
FIG. 6C is a detail view of one of the linkage assemblies that connect the wall assemblies to the base assembly for the deceleration system shown in FIG. 1.

The linkage systems 170, cooperatively with the associated wall and the wall-mounting flanges 122, form a four-bar linkage. A fragmentary detail view showing the linkage system 170 in the deployed position is shown in FIG. 6C. The linkage system 170 is configured to cause the walls to be displaced outwardly from the base 110 as they move from the non-deployed position (see, FIG. 5A) to the deployed position (see, FIG. 6A). The linkage systems 170 are all the same, and so only one will be described, with reference to FIG. 6C. The linkage system 170 comprises a pair of outer members 171 that connect at one end to the mounting flanges 122 with a first pivot 172, and at the other end to the wall 141 with a second pivot 173. An inner member 174 connects at one end to the mounting flanges 122 with a third pivot 175 and at the other end to the wall 141 with a fourth pivot 176. The outer members 171 are biased toward the open position with spring members 177 (one visible in FIG. 6C). The outer members 171 are shaped with stops 171' and 171" that engage the third pivot 175 to limit the rotation of the outer members 171 to about ninety degrees and a recess 171''' that engages the fourth pivot 176 to limit the rotation of the wall 141 to about one hundred eighty degrees. The inner member 174 has a shaped recess (not visible in FIG. 6C) that engages the first pivot 172 to limit the rotation of the inner member 174. The linkage systems 170 therefore bias the walls toward the deployed position wherein the walls are pivoted about one hundred eighty degrees from the non-deployed position and moved outwardly from the base assembly 110. The stops prevent the walls from over-rotating so that the walls will not interfere with the payload 90.

As discussed above, one or more of the outer surface of the walls 131, 141, 151, 161, may have solar panels 135 mounted thereon. For example, the solar panels 135 may be used to charge a battery or other energy storage device for powering the various electronic components for the deceleration system 100, including components for transmitting the system location, receiving signals for initiating deployment, and controlling deployment of the deployable decelerator assembly 190. Referring again to FIGS. 6A and 6B, in a current embodiment, a power control board 136 is mounted to an interior surface of the front wall 131; a battery unit 156, for example, a lithium-ion battery, is mounted on the interior surface of the rear wall 151; and a satellite-based position detection system and transmitter 146 is mounted on the interior surface of left wall 141 (wherein "the interior surface" refers to the surface facing inwardly when the wall assembly 130 is in the non-deployed position).

Figure 7A:
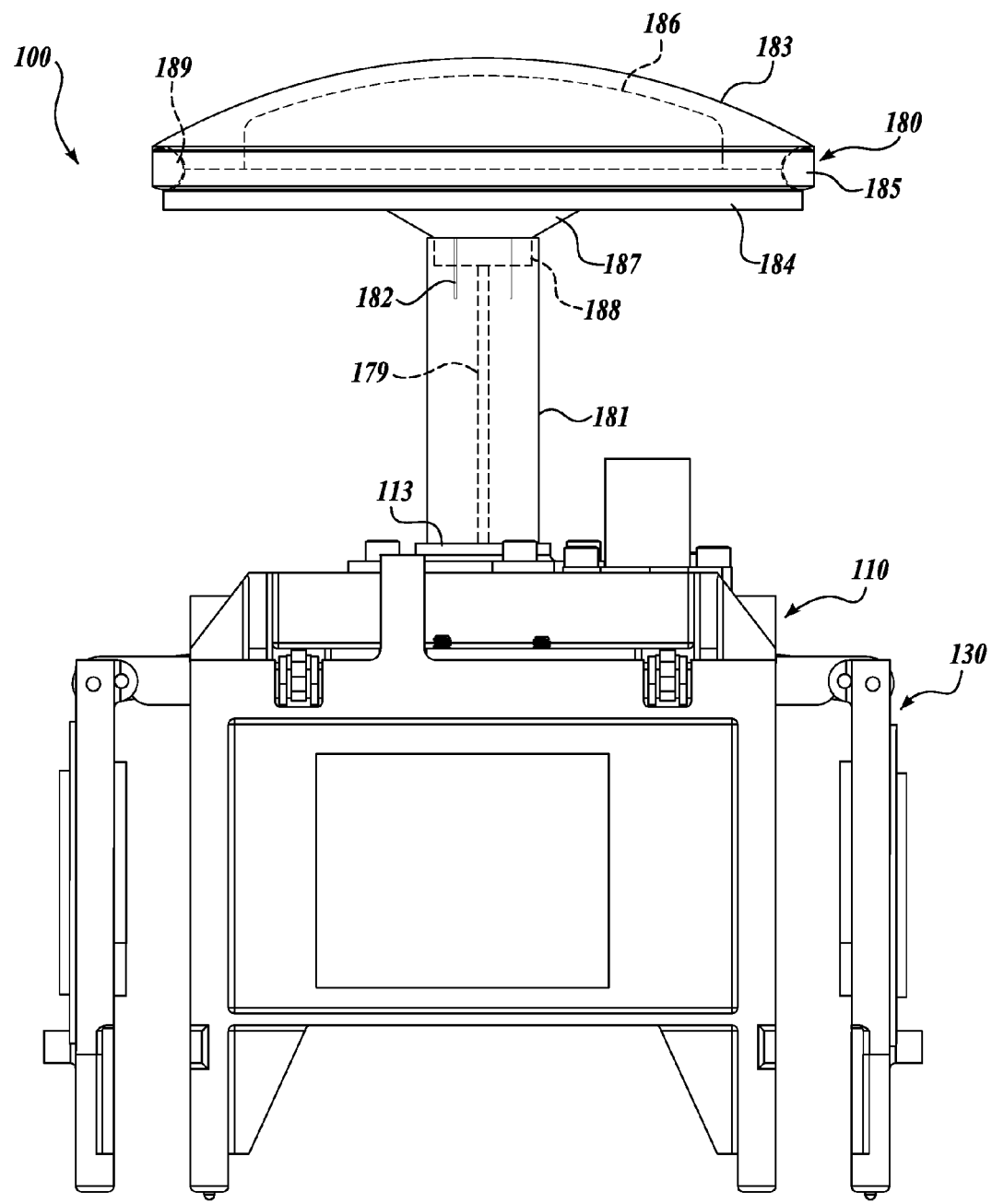
FIG. 7A is a front view of the deployable deceleration system in the deployed position with the deployable decelerator and other related structure removed for clarity.

FIG. 7A is a front view of the deployable deceleration system 100 with the wall assembly 130 in the deployed position and the deployable decelerator assembly 190 removed to show other components. The heat shield 180 is attached to the base assembly 110 with the splitting strut 181 that is fixed to the strut support 113 mounted on the base assembly 110 and the cable 179 that extends through the strut 181 and is attached to the base assembly 110. In a current embodiment the splitting strut 181 comprises a tubular member, having spaced-apart slots or notches 182, which are discussed below. In this embodiment, the heat shield 180 comprises an outer dome portion 183 formed from a high-temperature-resistant solid, such as a ceramic, carbon-carbon composite, refractory metal alloy, or the like. A dome base 184 is attached to the bottom of the dome portion 183, for example, with attachment bolts (not shown). An attachment ring 185 is disposed in a corresponding circumferential slot 189 defined cooperatively by the dome portion 183 and dome base 184. The attachment ring 185 attaches the deployable decelerator assembly 190 to the heat shield 180. For example, an inner diameter portion of the deployable decelerator assembly 190 may extend partially around the attachment ring 185 such that a portion of the deployable decelerator assembly 190 is clamped by the attachment ring 185, between the attachment ring 185 and the heat shield 180. In a current embodiment the attachment ring 185 is formed from the same material as the heat shield dome portion 183, such that the thermal expansion characteristics of the attachment ring 185 will be compatible with those of the heat shield dome portion 183. In this embodiment, a hollow region between the dome portion 183 and the dome base 184 is substantially filled with a low-weight, fibrous insulation 186.

The dome base 184 includes an anvil portion 187 that abuts the splitting strut 181, and an end portion 188 that extends into and frictionally engages the splitting strut 181. A tension cable 179 is attached at one end to the end portion 188 of the dome base 184, and extends through the strut 181, wherein the opposite end of the tension cable 179 is attached to the base assembly 110.

It will be appreciated that the heat shield 180 will be oriented generally in the direction of travel, e.g., in the direction that will experience the greatest friction heating during reentry. The heat shield 180 will also be directed generally downwardly when the deceleration system 100 makes contact with the ground. The anvil portion 187 of the dome base 184 is generally frustoconical in shape, and is designed such that upon impact of the heat shield 180 with the ground, the anvil portion 187 will generate an outward force on the splitting strut 181.

Figure 7B:
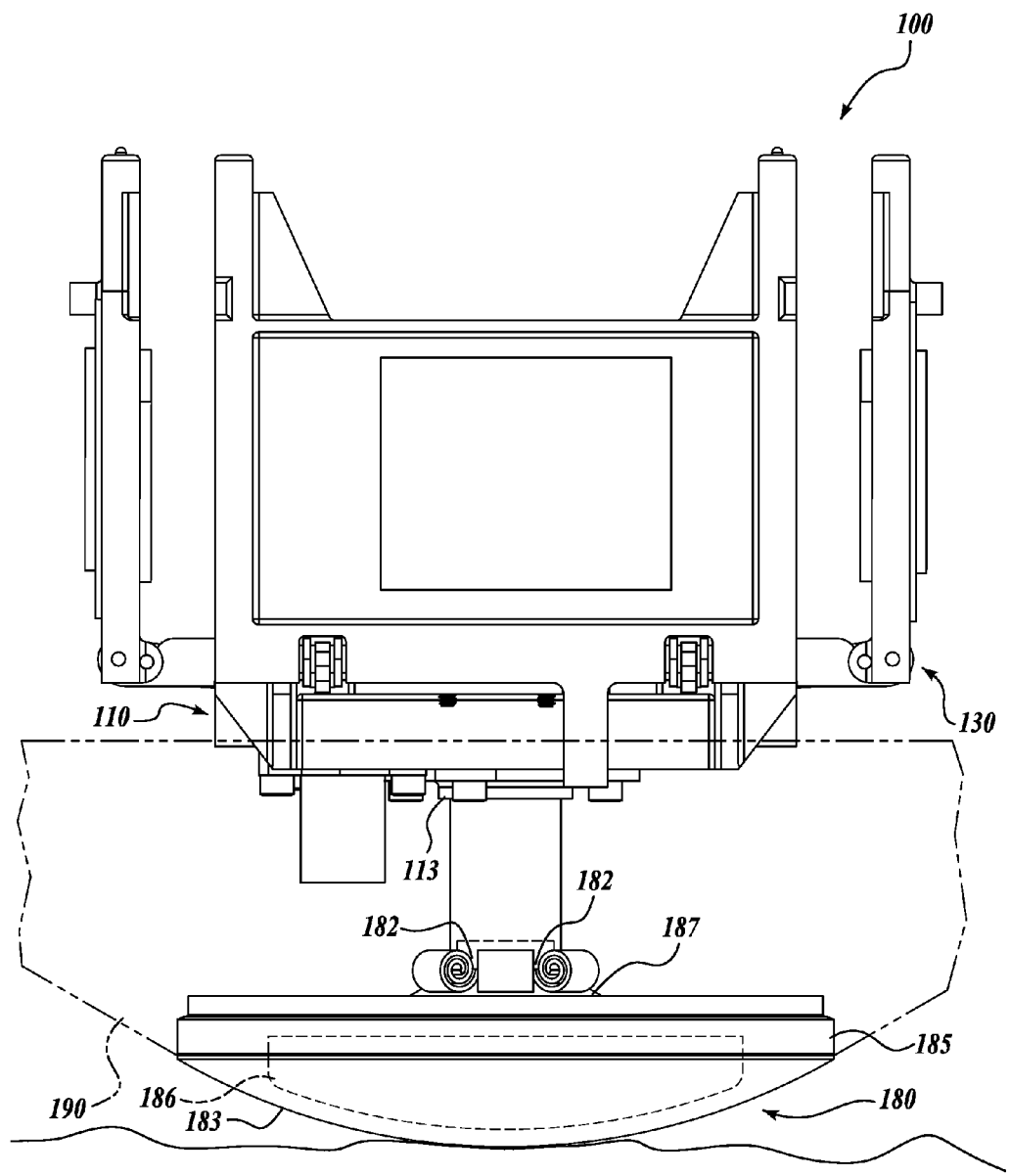
FIG. 7B illustrates the deployable deceleration system shown in FIG. 1, after impact with the ground.

FIG. 7B illustrates the deployable deceleration system 100 after impact with the ground (a fragmentary portion of the deployable decelerator assembly 190 is shown in phantom). The notches 182 in the strut 181 define relatively weakened portions of the strut 181, such that the strut 181 will tend to split along the direction of the notches 182. Persons of skill in the art will appreciate that the energy absorbed by the splitting and deformation of the splitting strut 181 upon impact with the ground acts as a shock absorber, providing a more gradual deceleration of the payload, e.g., satellite 90 (not shown), thereby cushioning the impact forces to the payload.

Although in the current embodiment the notches 123 provide a convenient mechanism for controlling the shock-absorbing characteristics of the strut 181, other mechanisms may be used to produce similar results. For example, the strut 181 may be provided with scoring, or a series of perforations to define and control the energy absorbing characteristics. Alternatively, a bladder having a compressible gas or other mechanism may be provided.

Figure 8:
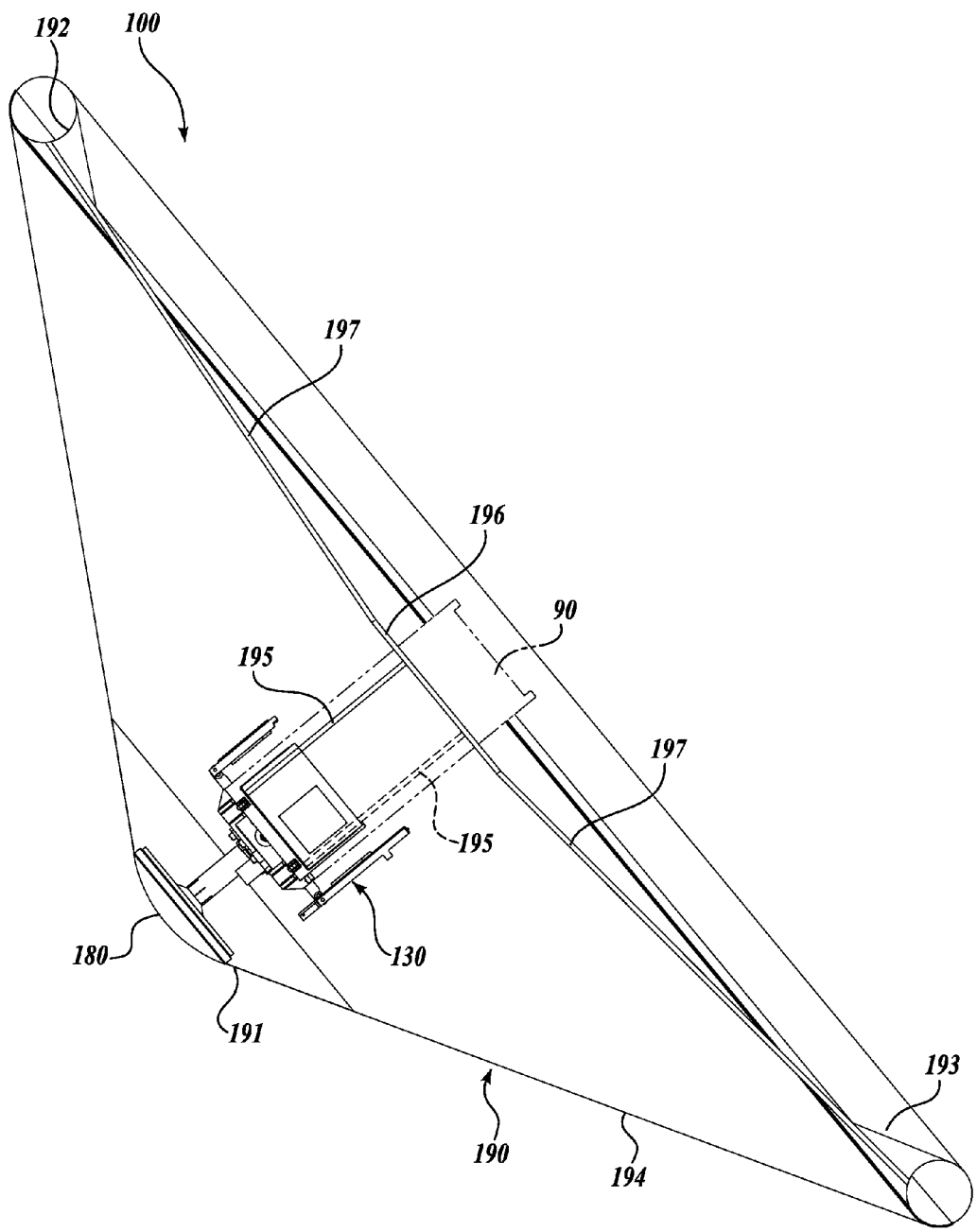
FIG. 8 shows a cross sectional side view of the deployable deceleration system shown in FIG. 1.

FIG. 8 shows a cross-sectional side view of the deployable deceleration system 100 in the deployed position with a satellite payload 90 attached. The deployable decelerator assembly 190 includes a deployable drag device 194 that may be, for example, generally conical or frustoconical, having a smaller-diameter inner perimeter 191 that is attached to the heat shield 180, for example with the attachment ring 185, as discussed above.

As seen most clearly in FIG. 8 and FIG. 2 together, the deployable drag device 194 in this embodiment has an inwardly-extending portion 193, defining an annular region (between the frustoconical portion of the drag device 194, and the inwardly-extending portion 193) that contains the inflatable torus 192. The inwardly-extending portion 193 may be attached to the frustoconical portion, for example, by stitching, or with a suitable adhesive. The annular region of the drag device 194 prevents the torus 192 from rolling outwardly under aerodynamic loading during reentry.

The inflatable torus 192 is fluidly connected to the outlet valve 127 (FIG. 4B) with a tubing system that includes one or more first tubes 195 (two shown) that extend from the outlet valve 127 to a toroidal tubular plenum 196 that is disposed about a distal portion of the payload 90. One or more second tubes 197 (two shown) extend from the toroidal plenum 196 to the torus 192. The first tubes 195, toroidal plenum 196, and second tubes 197 provide a fluid flow path for inflating the torus 192 using the compressed gas in the pressure chamber 114 (FIG. 4A). In a current embodiment, the first tubes 195, toroidal plenum 196, and second tubes 197 are formed from a heat resistant, flexible and pliable weight material, for example ¼" polyimide tube, such that the tubular members may be compactly stowed with the drag device 194 prior to deployment.

The first tubes 195, toroidal plenum 196, and second tubes 197 also preferably provide mechanical support to stabilize the payload 90 during reentry. In the current embodiment, additional straps 198, for example nylon straps, are provided that connect the toroidal plenum 196 with the inwardly-extending portion 193 of the drag device 194. Although two straps 198 are shown, more straps may be provided.

In a current embodiment, the drag device 194 is flexible, so that it may be deployed to a variety of high-drag deployable shapes. An effective shape for Earth reentry is a sixty-degree right circular cone. The drag device 194 is formed from a high-temperature-resistant, high strength fabric, for example, a synthetic polymer such as a thermoset liquid crystalline polyoxazole. A suitable fabric is Zylon™, available from the Toyobo Corporation (http://www.toyobo.co.jp/e/), and having an IUPAC designation poly(p-phenylene-2,6-benzobisoxazole). Alternatively, a metal oxide fabric composite fabric may be suitable, for example, Nextel™ available from 3M (www.3m.com). Alternatively, a fiberglass fabric or the like may be suitable.

The fabric may be coated with a flexible ablative material, for example, a lightweight, reinforced elastomeric coating to provide additional thermal protection as needed. Suitable coatings include Hi-Tac™, available from Rocket Lab (www.rocketlab.co.nz), or FlexFram™ from Fiber Materials, Inc. (www.fibermaterialsinc.com).

The deployable drag device 194 may be formed from multiple sections of fabric that are sewn together with longitudinal seams. Each fabric section is preferably aligned such that a primary woven fiber direction is parallel to the predicted maximum stress direction.

The fabric is deployed by inflating the torus 192 that is attached to, for example, sewn into, the fabric around the base of the drag device 194. The torus 192 is formed from a high temperature, flexible material, such as polyimide, silicone rubber or the like.

An electrical power system manages power for activating the burn wire mechanism 123, activating the solenoid valve 116, and activating the position transmitter 146. Prior to deployment of the deceleration system, an onboard electrical power system maintains the battery unit 156 in a charged condition with power generated by the solar panels 135.

To deploy the deceleration system 100, a command signal triggers activation of the burn wire mechanism 123, which releases the four-part wall assembly 130 as discussed above. The command signal may be transmitted remotely and received by the deceleration system 100, or may be locally generated, for example, based on a timer or other trigger criteria. The walls 131, 141, 151, 161 therefore move from the non-deployed position to the deployed position. In a current embodiment, the battery unit 156 is connected to the burn wire mechanism 123 through a 12 VDC charge pump circuit (not shown).

When the solenoid valve 116 receives a command signal, it opens fully to begin blow down of the pressurized chamber 114 through the flow restricting orifice 119 and out the outlet port 127 to inflate the torus 192, and deployment of the decelerator assembly 190. It will be appreciated that the command signal for deployment of the wall assembly 130 and the command signal for deployment of the decelerator assembly 190 may be separated by a significant period of time. Alternatively, the deployment of the wall assembly 130 may trigger deployment of the decelerator assembly 190. In a current embodiment, the battery unit 156 is connected to the solenoid valve 116 through the 12 VDC charge pump circuit and a 3 VDC voltage regulator (not shown).

In the current embodiment, the restricting orifice 119 provides a gradual pressurization of the torus 192. In a current embodiment the pressurant is carbon dioxide, which is initially in a partially liquefied phase in the pressure chamber 114. When the solenoid valve 116 receives the electrical command, it opens a flow path from the pressure chamber 114 to the outlet port 127 through the restricting orifice 119, to begin pressurization of the torus 192. The restricting orifice 119 is sized such that the blow-down from the pressure chamber 114 will inflate the torus 192 (thereby deploying the decelerator assembly 190) at a rate or flow profile to always provide an internal pressure in the torus 192 that is capable of supporting the structure under the variable aerodynamic loading that occurs during reentry. In other words, due to the gradual pressurization of the torus 192, the effective pressure in the torus 192 will vary during reentry, without requiring any active control of the flow from the pressure chamber 114. In particular, the restricting orifice 119 is selected based on the pressurant properties and the predicted aerodynamic and pressure loadings anticipated during reentry, such that the gradual flow of pressurant to the torus will produce an unsteady pressure in the torus 192 that is at least sufficient to produce the required support to the deployable decelerator assembly 190 through the reentry profile. This approach provides an extremely reliable and robust method, which also limits the stress in the inflated decelerator.

While illustrative embodiments have been illustrated and described, it will be appreciated that various changes can be made therein without departing from the spirit and scope of the invention.

The embodiments of the invention in which an exclusive property or privilege is claimed are defined as follows:

1. A satellite recovery system for returning a satellite to earth, the system comprising:
    a base portion configured to attach to the satellite, the base portion including a pressurized gas system;
    a heat shield attached to the base portion;
    a plurality of walls hingedly attached to the base portion, the plurality of walls being movable between a non-deployed position wherein the plurality of walls and the base portion define a cavity; and a deployed position wherein the plurality of walls are pivoted at least ninety degrees from the non-deployed position; and
    a deployable decelerator assembly movable from a non-deployed position wherein the decelerator assembly is disposed in the cavity defined by the plurality of walls and the base portion, and a deployed position, the decelerator assembly having an inner perimeter attached to the heat shield and an outer perimeter comprising an expandable torus that is operably connected to the pressurized gas system.

2. The satellite recovery system of claim 1, wherein the pressurized gas system comprises a pressure chamber, an inlet valve configured for pressurizing the pressure chamber, and a controllable outlet valve configured to fluidly connect the expandable torus to the pressurized chamber.

3. The satellite recovery system of claim 2, wherein the pressure chamber is pressurized with carbon dioxide, wherein at least a portion of the carbon dioxide is in liquid phase.

4. The satellite recovery system of claim 2, wherein the controllable outlet valve comprises a solenoid valve.

5. The satellite recovery system of claim 2, wherein the pressurized gas system further comprises a high pressure relief valve to prevent over-pressurization of the pressure chamber, and a low pressure relief valve to prevent over-pressurization of the expandable torus.

6. The satellite recovery system of claim 2, further comprising a restricting orifice disposed between the pressure chamber and the expandable torus, such that when the controllable outlet valve fluidly connects the expandable torus to the pressure chamber the restricting orifice impedes the flow to the torus such that pressure in the torus varies during reentry.

7. The satellite recovery system of claim 1, wherein the heat shield comprises a dome portion comprising a rigid, heat resistant material, and a base portion attached to the dome portion.

8. The satellite recovery system of claim 7, wherein the dome portion of the heat shield comprises at least one of a ceramic, a carbon-carbon composite, and a refractory metal alloy.

9. The satellite recovery system of claim 7, wherein the heat shield is attached to the base portion with a cable and an elongate tubular strut.

10. The satellite recovery system of claim 9, wherein the tubular strut includes a plurality of longitudinal features that define regions of relative weakness in the strut, and further wherein the base portion of the heat shield comprises an anvil portion configured to deform the strut upon impact of the heat shield with the ground, thereby absorbing a portion of the energy of the impact.

11. The satellite recovery system of claim 10, wherein the longitudinal features in the strut comprise elongate notches.

12. The satellite recovery system of claim 1, wherein the plurality of walls are hingedly attached to the base portion with four-bar linkage systems that are configured such that the walls are displaced outwardly away from the base when they are pivoted to the deployed position.

13. The satellite recovery system of claim 12, wherein the plurality of walls are biased toward the deployed position.

14. The satellite recovery system of claim 13, wherein the walls interlock when in the non-deployed position such that when a first wall of the plurality of walls is in the non-deployed position the other walls of the plurality of walls are constrained from pivoting to the deployed position, and when the first wall is pivoted to the deployed position the other walls are not constrained from pivoting to the deployed position.

15. The satellite recovery system of claim 14, further comprising a remotely actuatable release mechanism that restrains the first wall from pivoting to the deployed position prior to actuation, and releases the first wall to pivot to the deployed position when the actuatable release mechanism is actuated.

16. The satellite recovery system of claim 1, wherein the deployable decelerator assembly comprises a flexible fabric panel.

17. The satellite recovery system of claim 16, wherein the flexible fabric panel is formed from a high-temperature-resistant fabric selected from a thermoset liquid crystalline polyoxazole.

18. The satellite recovery system of claim 16, wherein the flexible fabric panel is coated with an ablative material.

19. The satellite recovery system of claim 18, wherein the ablative material comprises a reinforced elastomer.

20. The satellite recovery system of claim 16, wherein the expandable torus comprises one of a silicone rubber and a polyimide.

21. The satellite recovery system of claim 16, wherein the flexible fabric panel further comprises an inwardly-extending portion such that the flexible fabric panel defines an outer annular region that contains the expandable torus.

22. The satellite recovery system of claim 1, further comprising means for stabilizing the satellite during reentry.

23. The satellite recovery system of claim 22, wherein the means for stabilizing the satellite during reentry comprises an inner ring member that encircles a distal portion of the satellite, and a plurality of straps that extend from the inner ring member to an outer portion of the decelerator assembly.

* * * * *